United States Patent [19]

Horian

[11] Patent Number: 4,871,096

[45] Date of Patent: Oct. 3, 1989

[54] LIQUID DISPENSER FOR A BOTTLE

[76] Inventor: Robert L. Horian, 357 N. Spaulding Cove, Heathrow, Fla. 32746

[21] Appl. No.: 177,302

[22] Filed: Apr. 4, 1988

[51] Int. Cl.[4] .............................................. F16K 24/04

[52] U.S. Cl. .................................... 222/487; 137/588; 137/594

[58] Field of Search ................ 137/588, 594; 222/482, 222/484, 490, 487

[56] References Cited

U.S. PATENT DOCUMENTS

| | | | |
|---|---|---|---|
| 159,054 | 1/1875 | Warker . | |
| 431,491 | 7/1890 | Tufts et al. . | |
| 553,389 | 1/1896 | Brower . | |
| 664,131 | 12/1900 | Lancey | 137/588 X |
| 1,017,756 | 2/1912 | Head . | |
| 1,054,146 | 2/1913 | Smirle | 137/588 X |
| 1,140,034 | 5/1915 | Hansen . | |
| 1,190,586 | 7/1916 | Robertson . | |
| 1,207,505 | 12/1916 | Cordley | 222/484 X |
| 1,368,703 | 2/1921 | Czerny . | |
| 1,494,043 | 5/1924 | Vogt . | |
| 2,065,785 | 12/1936 | Anschicks . | |
| 2,086,219 | 9/1935 | Geyser . | |
| 2,324,162 | 7/1943 | Hubenet | 222/482 |
| 2,364,206 | 9/1942 | Gardes | 220/56 |
| 2,589,622 | 6/1948 | McCabe | 222/481.5 |
| 2,713,988 | 7/1955 | Kitterman | 251/322 |
| 2,915,224 | 10/1956 | Beall, Jr. | 222/153 |
| 2,939,611 | 6/1960 | Nebinger | 222/131 |
| 3,187,770 | 10/1962 | Plamann | 137/589 |
| 3,220,617 | 11/1965 | Veistrup | 222/484 X |
| 3,373,907 | 5/1966 | Batrow | 222/399 |
| 3,376,582 | 2/1966 | Samuels | 222/488 |
| 3,405,848 | 11/1966 | Damrel | 222/481.5 |
| 3,560,047 | 6/1969 | Davis | 297/188 |
| 3,814,293 | 6/1974 | Daves | 222/173 |
| 4,664,297 | 5/1987 | Giovinazzi | 222/185 |
| 4,687,122 | 8/1987 | Bothun et al. | 222/183 |
| 4,722,463 | 2/1988 | Anderson | 137/588 X |

FOREIGN PATENT DOCUMENTS

| | | | |
|---|---|---|---|
| 11748 | 9/1854 | France | 222/487 |
| 477080 | 8/1951 | Italy | 137/588 |

*Primary Examiner*—Andres Kashnikow
*Assistant Examiner*—Kevin P. Weldon
*Attorney, Agent, or Firm*—Quarles & Brady

[57] ABSTRACT

A dispenser for a liquid in a bottle has a housing adapted to screw onto a threaded neck of the bottle. A tubular valve plunger is located within an aperture in the housing to form a liquid passage between the housing and the valve plunger. The valve plunger includes a mechanism for releasably sealing the liquid passage. A vent plunger is within the tubular valve plunger forming a separate passage for air to enter the bottle as the liquid flows out. The vent plunger includes a mechanism for releasably sealing the air passage. When the dispenser is operated the air passage is opened first to release any gas pressure within the bottle, before the liquid passage is opened.

8 Claims, 2 Drawing Sheets

LIQUID DISPENSER FOR A BOTTLE

The present invention relates to apparatus for dispensing liquids from a container, and more particularly to a dispenser which can be attached to the neck of a bottle.

BACKGROUND OF THE INVENTION

Carbonated beverages are available in two and three liter plastic bottles. Typically these bottles are stored upright in a refrigerator and when their contents are withdrawn, a cap is removed from the bottle and the liquid contained therein is poured out. Although it is economical to purchase beverages in these large bottles, their size makes pouring awkward, especially for children. Therefore, it is desired that a replacement cap for the bottle be provided which has an integral sealable mechanism for dispensing the liquid without having to remove the cap. This would allow the bottle to be stored on its side in a refrigerator and the dispenser cap simply activated to empty the contents of the bottle as desired. For this purpose sealable spigots have been devised for these containers.

When liquid is poured from a bottle, the liquid will gurgle as air is forced to enter the opening against the liquid flow in order to replace the liquid that is flowing out of the bottle. The gurgling of the flow often results in a splashing of the liquid into the container into which it is being drawn. The same gurgling occurs if a simple spigot is used in a bottle that is on its side in a refrigerator. In addition if the contents of the bottle is a carbonated beverage the liquid will be under pressure due to the escape of the carbonated gas from the beverage into the atmosphere within the bottle. As a result when the spigot is first opened the liquid may tend to spurt out due to the gas pressure.

It is therefore desirable to provide a liquid dispenser with a passage which allows air to enter the bottle without producing a gurgling-action. It is further desirable to release the gas pressure within the bottle prior to the flow of the liquid through the dispenser.

SUMMARY OF THE INVENTION

A dispenser according to the present invention has a housing that is adapted to be attached to a liquid container, such as to the neck of a bottle. The dispenser housing has an aperture therethrough. A tubular valve plunger extends through the aperture forming a first passage between the housing and the valve plunger through which the liquid from the container can flow. The plunger is provided with a releasable sealing mechanism to close the first passage. A vent plunger is located within the tubular valve plunger to provide a second passage between these two elements through which air can enter the container. Another releasable sealing mechanism is provided to close the second passage.

The general object of the present invention is to provide a device for dispensing a liquid from a closed container.

A specific object of the present invention is to provide such a liquid dispensing device with a passage which allows air to enter the container to replace the liquid that is flowing out of it. This air passage is separate from the passage through which the liquid flows.

A further object of the present invention is to provide a liquid dispenser which enables gas pressure within a container to be released prior to the commencing of flow of the liquid out of the container.

Yet another object of the present invention is to provide a liquid dispenser for a container which is self-sealing when it is deactivated by the user.

A still further object is to enable such a dispenser to be attachable to common beverage bottles.

DETAILED DESCRIPTION OF THE PRESENT INVENTION

Figure 2:
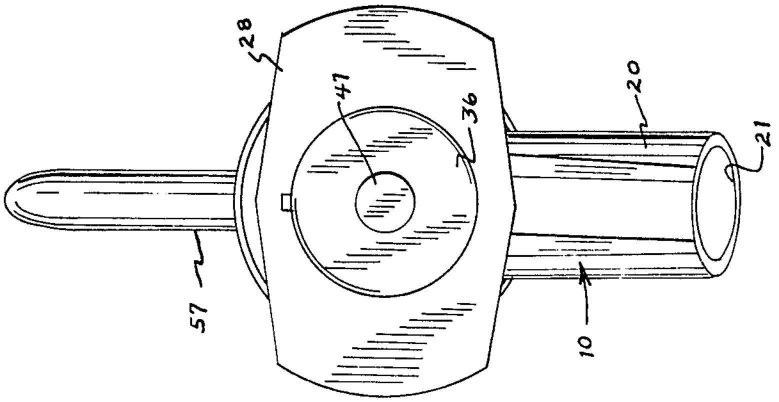
FIGS. 1 and 2 are two orthogonal plane views of the liquid dispenser according to the present invention.

With reference to the drawings, a liquid dispenser, generally designated 10, has a hollow housing 12. The housing has an annular end portion 13 with a threaded central opening 14 coaxial with a longitudinal axis 11. The opening 14 is adapted to be threaded on the neck 17 of a conventional liquid container, such as a two or three liter carbonated beverage bottle 15. This attachment of the dispenser 10 to the bottle 15 provides an air and liquid tight seal between the two elements. The outer circumferential surface of the annular portion 13 has a number of depressions 16 to aid in grasping the dispenser as it is screwed onto and off of the bottle 15.

The housing 13 has a cylindrical inner chamber 18 which communicates with the threaded central opening 14. The diameter of the inner chamber 18 is less than the diameter of the central opening 14 thereby defining a coaxial inner rim 19 at the interface therebetween. The housing 12 further includes a tubular spout 20 centrally extending at an angle from the housing. The conduit 21 of the tubular spout 20 provides an opening out of the inner chamber 18. The end of the inner chamber 18 which is remote from the central opening 14 terminates in an interior wall 22 having a circular aperture 23 therethrough which is centered on axis 11.

The circular aperture 23 provides communication between the inner chamber 18 and an outer chamber 24 of the housing 12. The outer chamber 24 is formed by a cylindrical coaxial aperture 29 in the distal portion 25 of the housing and extends from the end 26 to the interior wall 22. Several vent orifices 27 penetrate radially through the wall of the distal portion 25 of the housing. The end 26 of the distal portion 25 terminates in an outwardly extending flange 28.

A cylindrical, tubular valve plunger 30 coaxially extends through the aligned openings and chambers in the housing 12. The outer circumference of the valve plunger 30 has an annular flange 31 with an angular sealing surface 32. In the closed state of the dispenser 10 illustrated in FIG. 3, the sealing surface 32 compresses a first O-ring 33 that is located within the inner rim 19. The compression of the first O-ring between the valve plunger 30 and the inner rim 19 of the housing provides a seal between the central opening 14 (as well as the interior of bottle 15) and the inner chamber 18. Therefore, in the closed state, liquid and gas cannot pass between the housing 12 and the valve plunger 30.

A second O-ring 34 is positioned snugly around the valve plunger 30 within the outer chamber 24. The second O-ring 34 is held against the interior wall 22 by a pressure ring 35 which is also around the valve plunger 30 within the outer chamber 24. A plunger cap 36 is attached to the end 37 of the valve plunger 30 which extends out of the outer chamber 24. The plunger cap 36 has an inner circumferential surface 38 with an annular projection 39. When the plunger cap 36 is assembled onto the end 37 of the valve plunger 30 the annular projection 39 fits into a mating annular groove around the outer surface of the valve plunger 30 to attach the two components. A first compression spring 40 is between the inner surface of the plunger cap 36 and the pressure ring 35 biasing the two components apart. The force exerted by the first compression spring 40 also compresses the second O-ring 34 between the pressure ring 35, the interior wall 22 and the valve plunger 30 to provide a fluid-tight seal between the housing 12 and the tubular valve plunger 30. The force of the first spring 40 also pulls the valve plunger 30 toward the distal end 26 of the housing compressing the first O-ring 33.

The inner surface 42 of the tubular valve plunger 30 has an inner wall 44 approximately midway along its length. The inner wall 44 has a central circular aperture 46 therethrough. A vent plunger 47 is located coaxially within the valve plunger 30 passing through the aperture 46 in inner wall 44 and through a coaxial aperture 45 in the plunger cap 36. The vent plunger 30 has an exposed end 48 projecting from the plunger cap 36. The other end 49 of the vent plunger 47 has a transverse disk 50 coaxial with the longitudinal axis 11 forming a sealing flange. A third O-ring 51 is located round the vent plunger 47 between the disk 50 and the inner wall 44 of the valve plunger to provide a seal therebetween.

A tube collar 52 is located within the valve plunger 30 at the end which extends into the bottle 15. The tube collar 52 is held within the valve plunger 30 by an inwardly extending projection 54 of the valve plunger. A second compression spring 55 is between the tube collar 52 and the vent plunger 47 biasing the two components apart. The force exerted by the second spring 55 compresses the third O-ring 51 between the vent plunger disk 50 and the inner wall 44 of the valve plunger 30. The tube collar 52 has an aperture 56 therethrough which receives a curved plastic tube 57 projecting from the tube collar into the bottle 15.

Figure 1:
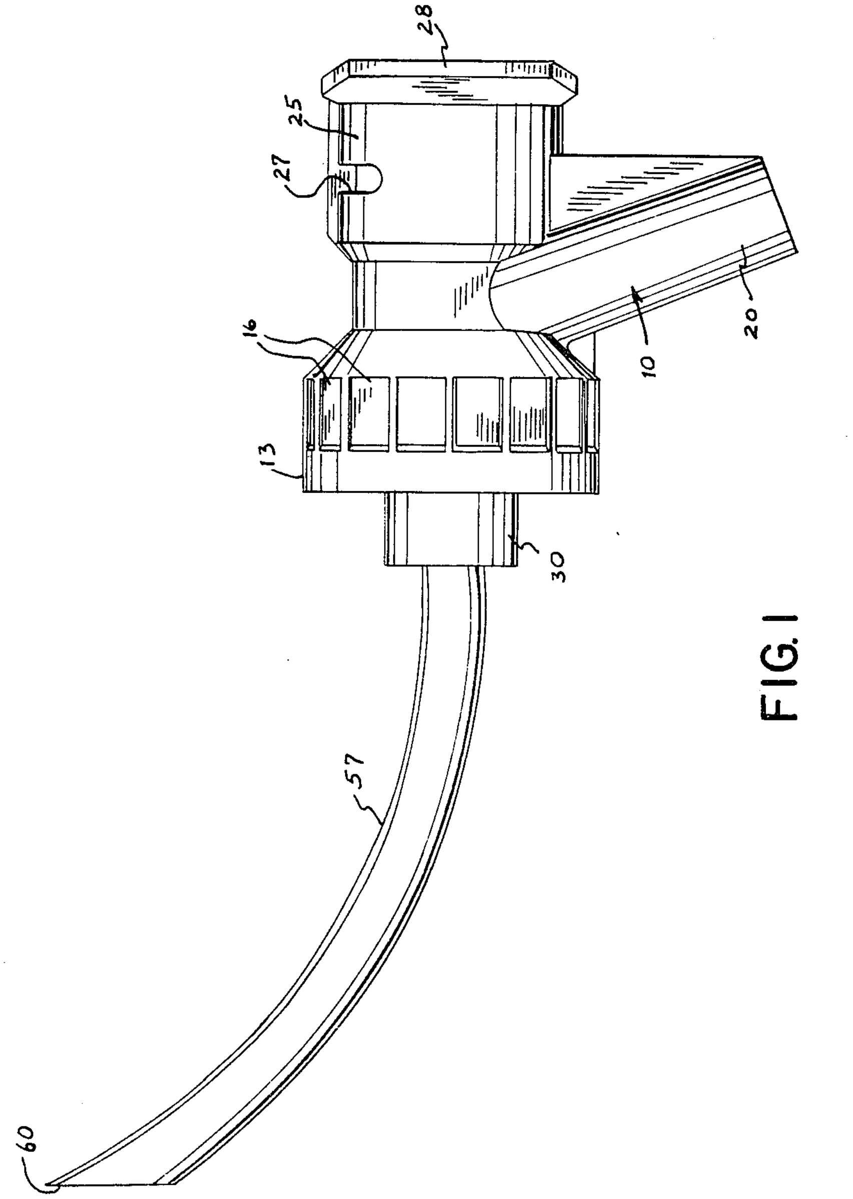
Figure 3:
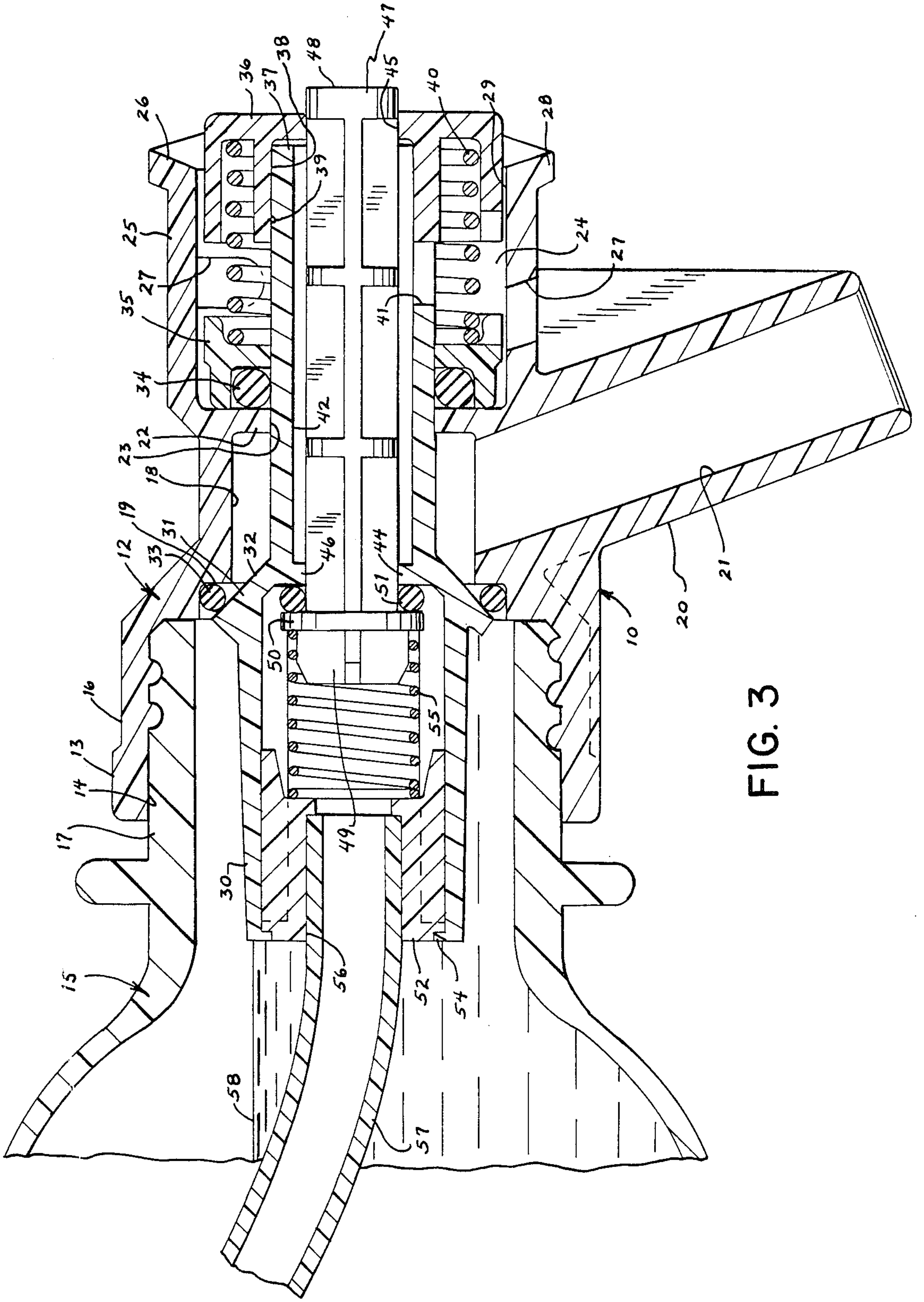
FIG. 3 is a cross-section view of the present liquid dispenser shown attached to a bottle.

The dispenser 10 is attached to the carbonated beverage bottle 15 by holding the bottle upright and threading the annular end portion 13 of the dispenser onto the neck 17 of the bottle as shown in FIG. 3. After the dispenser 10 has been tightened on the neck of the bottle, the combined structure may be placed horizontally on a surface, such as the shelf of a refrigerator, with the spout 20 of the dispenser facing downward. In this position the tube 57 extends into the bottle in an upward curve so that its remote end 60 (FIG. 1) is positioned in the gas bubble within the bottle. This remote end 60 of the tube 57 is cut at an angle so that its opening will not be closed by contact with the bottle 15.

In the closed state, the bias provided by the first compression spring 40 forces the plunger cap 46 outward from the housing 12 thereby pulling the valve plunger 30 attached to the cap. The force on the valve plunger compresses the first O-ring 33 between the sealing flange 31 and the housing 12 preventing fluid from flowing between the housing 12 and the valve plunger 30. Similarly, the second compression spring 55 forces the vent plunger 47 toward the distal end 26 of the housing compressing the third O-ring 51 between the vent plunger 47 and the valve plunger 30. This force from the second spring 55 closes a seal between the two plungers 30 and 36. In addition to the closing force exerted by the springs 40 and 55, the gas pressure within the bottle tends to push the plungers 30 and 47 into a sealed state. Unlike previous devices which relied only on spring force, the unique design of the present dispenser also utilizes the inherent gas pressure to seal the bottle. In this sealed, or closed, state, the liquid within the bottle cannot flow through the dispenser 10, nor can the carbonation escape.

When it is desired to dispense some of the carbonated liquid from within the bottle 15, the user's index and fore fingers are placed around the distal portion 25 of the housing 12 behind the flange 28, and the vent plunger 47 and the plunger cap 36 are pressed with the thumb. Initially, the vent plunger 47 is pressed inward before the user contacts the plunger cap 36. Therefore, the seal provided by the third O-ring 51 between the vent plunger 47 and the valve plunger 30 is released first. This allows any pressurized gas within the bottle to escape along a path through curved tube 57 into the interior of the valve plunger 30 along a passage between the valve plunger and the vent plunger 47. From there, the gas flows via opening 41 into the outer chamber 24 of the housing 12 escaping through the vent orifices 27. The curvature of the tube 57 is specifically designed to enable the gas to escape when the bottle 15 is stored on its side with the spout 50 pointing downward. If the level 58 of the liquid within the bottle is above the opening of tube 57, any liquid which flows along this path will run out of the lower vent orifice 27 adjacent spout 20 and into the user's glass or cup (not shown).

As the user continues to depress the vent plunger 47, eventually the plunger cap 36 also will be pressed inward along with the valve plunger 30 attached thereto. This continued motion moves the valve plunger sealing flange 31 away from the first O-ring 33 opening a second passage for the carbonated liquid within the bottle to flow from the neck 17 of the bottle into the inner chamber 18 of the housing and out of the spout 20. The seal provided by the second O-ring 34 is still maintained and prevents the liquid within the inner chamber 18 from flowing into the outer chamber 24 of the housing 12.

As the liquid flows from the bottle 15, air enters the dispenser through the vent orifices 27 and flows between the plunger cap 36 and the pressure ring 35. The air continues to flow in the passage between the valve plunger 30 and the vent plunger 47 past the released seal of the third O-ring 51. The air then flows through the aperture 56 in the tube collar 52 into the tube 57 and the upper portion of the bottle 15. This separate passageway for air to enter the bottle eliminates the gurgling normally associated with pouring liquid from a bottle and further eliminates foaming of a carbonated liquid contained within the bottle 15.

When the user releases the dispenser 10, the valve and vent plungers 30 and 47 seal the bottle. As the force exerted by the user's thumb on the vent plunger 47 and the plunger cap 36 eases, the seal between the valve plunger 30 and housing 12 at first O-ring 33 is made first. After the valve plunger 30 seats against the first O-ring 33, further easing of the thumb force causes the vent plunger 47 to seat against the third O-ring 51 fully sealing the bottle 15. This combined action insures that the passage for the liquid closes before the air inlet passage, further reducing the splashing of the liquid flowing from the bottle. The two compression springs 40 and 55 provide a positive sealing force. In addition gas pressure due to a carbonated liquid within the bottle will provide additional sealing force against the valve plunger 30 and the vent plunger 47 further compressing the first and third O-rings 33 and 51. This sealing force increases as the gas pressure rises.

The present dispenser 10 is designed so that the gas pressure within the bottle 15 is released before the liquid begins to flow out of the spout 20. This preliminary action prevents the liquid from gushing out of the dispenser due to the carbonated gas pressure. In addition the dispenser provides a separate passage for air to enter the bottle to replace the liquid that is flowing out which is separate from the passage of the liquid out of the bottle. These two passages eliminate the gurgling normally associated with pouring liquids from bottles.

I claim:

1. A dispenser for a liquid contained in a bottle having a threaded neck comprising:

a housing having an integral annular portion with a threaded first aperture for receiving the bottle neck, an inner chamber opening into the threaded first aperture, and a conduit for carrying liquid from said inner chamber out of the housing;

a tubular valve plunger extending within said housing from the first aperture through said inner chamber and through an opening in said housing, and having a first means for releasably sealing the inner chamber from the threaded first aperture, said valve plunger having a longitudinal aperture extending from a first end to a second end which is proximate to the first aperture of said housing and having an inner wall extending into the longitudinal aperture spaced from the first and second ends, the inner wall having an aperture therethrough, and having a cap at said first end with an aperture therethrough;

a vent plunger within said tubular valve plunger and extending through the aperture in the inner wall and out of the first end of said valve plunger through the aperture in the cap, said vent plunger including a second means for releasably sealing the aperture in the inner wall; and a first spring biasing said cap with respect to said housing;

a tube collar held within the second end of said valve plunger and having an aperture therethrough;

a second spring within said valve plunger biasing said vent plunger with respect to said tube collar.

2. The dispenser as recited in claim 1 wherein said second means for releasably sealing the aperture in the inner wall comprises and annular projection extending from said vent plunger.

3. The dispenser as recited in claim 2 further comprising:

a tube received in the aperture of said tube collar and projecting from the second end of said valve plunger.

4. The dispenser as recited in claim 1 wherein said first means for releasably sealing the inner chamber from the threaded aperture comprises an annular sealing flange around said valve plunger which engages a sealing element against the housing.

5. The dispenser as recited in claim 1 further comprising:

means for sealing between said housing and said valve plunger to prevent liquid from flowing therebetween and through the aperture in the inner wall.

6. The dispenser as recited in claim 1 further comprising means, engaged by said first spring, for sealing the opening in said housing through which the valve plunger extends so that fluid cannot pass through that aperture between said housing and said valve plunger.

7. The dispenser as recited in claim 1 wherein said first spring is received in a second aperture in said housing, and the valve plunger cap extends around said first spring and into the second aperture in said housing.

8. The dispenser as recited in claim 1 wherein said valve plunger has an radial opening; and said housing has a further opening which communicates with the radial opening in said valve plunger to enable air to enter the bottle when the dispenser is in an open state.

* * * * *